United States Patent
Furui

(10) Patent No.: US 10,618,453 B2
(45) Date of Patent: Apr. 14, 2020

(54) VEHICLE LAMP

(71) Applicant: Koito Manufacturing Co., Ltd., Tokyo (JP)

(72) Inventor: Takashi Furui, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 16/352,977

(22) Filed: Mar. 14, 2019

(65) Prior Publication Data

US 2019/0283658 A1    Sep. 19, 2019

(30) Foreign Application Priority Data

Mar. 19, 2018  (JP) ................................ 2018-051391

(51) Int. Cl.
| | |
|---|---|
| *B60Q 1/00* | (2006.01) |
| *B60Q 1/04* | (2006.01) |
| *F21S 45/48* | (2018.01) |
| *F21S 45/10* | (2018.01) |
| *F21Y 115/10* | (2016.01) |

(52) U.S. Cl.
CPC ............. *B60Q 1/0023* (2013.01); *B60Q 1/04* (2013.01); *F21S 45/10* (2018.01); *F21S 45/48* (2018.01); *F21Y 2115/10* (2016.08)

(58) Field of Classification Search
CPC .... B60Q 1/0023; B60Q 1/04; B60Q 2200/00; F21V 29/00; F21V 29/02; F21V 29/002; F21V 29/10; F21V 29/20; F21V 29/507; F21S 45/10; F21S 45/48; F21Y 2115/10
See application file for complete search history.

(56) References Cited

U.S. PATENT DOCUMENTS

2009/0302766 A1*  12/2009  Behr ................... B60Q 1/0023
                                                    315/82

FOREIGN PATENT DOCUMENTS

| JP | 2002-160579 A | 6/2002 |
|---|---|---|
| JP | 2017-056829 A | 3/2017 |

* cited by examiner

*Primary Examiner* — Joseph L Williams
*Assistant Examiner* — Jose M Diaz
(74) *Attorney, Agent, or Firm* — Abelman, Frayne & Schwab

(57) ABSTRACT

A vehicle lamp mounted on a vehicle includes a lamp including a light emitting element, and a sensor configured to acquire information on outside the vehicle. The lamp and the sensor are thermally connected, and at least a part of an exterior of the sensor has a heat radiation function.

9 Claims, 3 Drawing Sheets

VEHICLE LAMP

CROSS-REFERENCE TO RELATED APPLICATIONS

This application is based on and claims priority from Japanese Patent Application No. 2018-051391, filed on Mar. 19, 2018, with the Japan Patent Office, the disclosure of which is incorporated herein in its entirety by reference.

TECHNICAL FIELD

The present disclosure relates to a vehicle lamp.

BACKGROUND

A vehicle such as a four-wheeled vehicle is provided with a vehicle lamp such as a headlamp (see, e.g., Japanese Patent Laid-Open Publication No. 2017-056829). Further, there is a headlight provided with a transceiver, a lamp unit, and a heat shielding plate that shields heat from the lamp unit to the transceiver (see, e.g., Japanese Patent Laid-Open Publication No. 2002-160579).

SUMMARY

When a sensor unit is mounted on a vehicle lamp together with a lamp unit, both of the lamp unit and the sensor unit may generate heat. In this case, it is necessary to arrange a heat radiating member that radiates the heat close to both of the lamp unit and the sensor unit, so that there is a restriction on the design in that the arrangement of the lamp unit and the sensor unit is restricted.

The present disclosure is to improve the degree of freedom in designing a vehicle lamp including a lamp unit and a sensor unit.

In order to achieve the above object, a vehicle lamp according to the present disclosure is a vehicle lamp mounted on a vehicle. The vehicle lamp includes: a lamp including a light emitting element; and a sensor configured to acquire information on outside the vehicle. The lamp and the sensor are thermally connected, and at least a part of an exterior of the sensor has a heat radiation function.

According to the vehicle lamp according to the present disclosure, heat generated from the lamp and the sensor unit may be released from the sensor. Therefore, it is not required to include a separate member for radiating heat in the vehicle lamp, so that the degree of freedom in designing the vehicle lamp may be improved.

Further, the vehicle lamp according to the present disclosure may include a connector configured to connect the lamp and the sensor, and at least a part of either of the lamp and the connector may have a heat radiation function.

According to this configuration, the heat generated from the lamp and the sensor may be efficiently released by the heat radiation function of the lamp or the connector.

Further, in the vehicle lamp according to the present disclosure, a portion that has the heat radiation function may be made of a material having high thermal conductivity.

According to this configuration, the heat generated from the lamp and the sensor may be more efficiently released by the thermal conductivity.

Further, in the vehicle lamp according to the present disclosure, the lamp and the sensor may be integrated.

According to this configuration, the degree of freedom in designing the vehicle lamp may be improved, and the number of components that constitute the vehicle lamp may be decreased.

According to the present disclosure, the degree of freedom in designing a vehicle lamp including a lamp and a sensor is improved.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
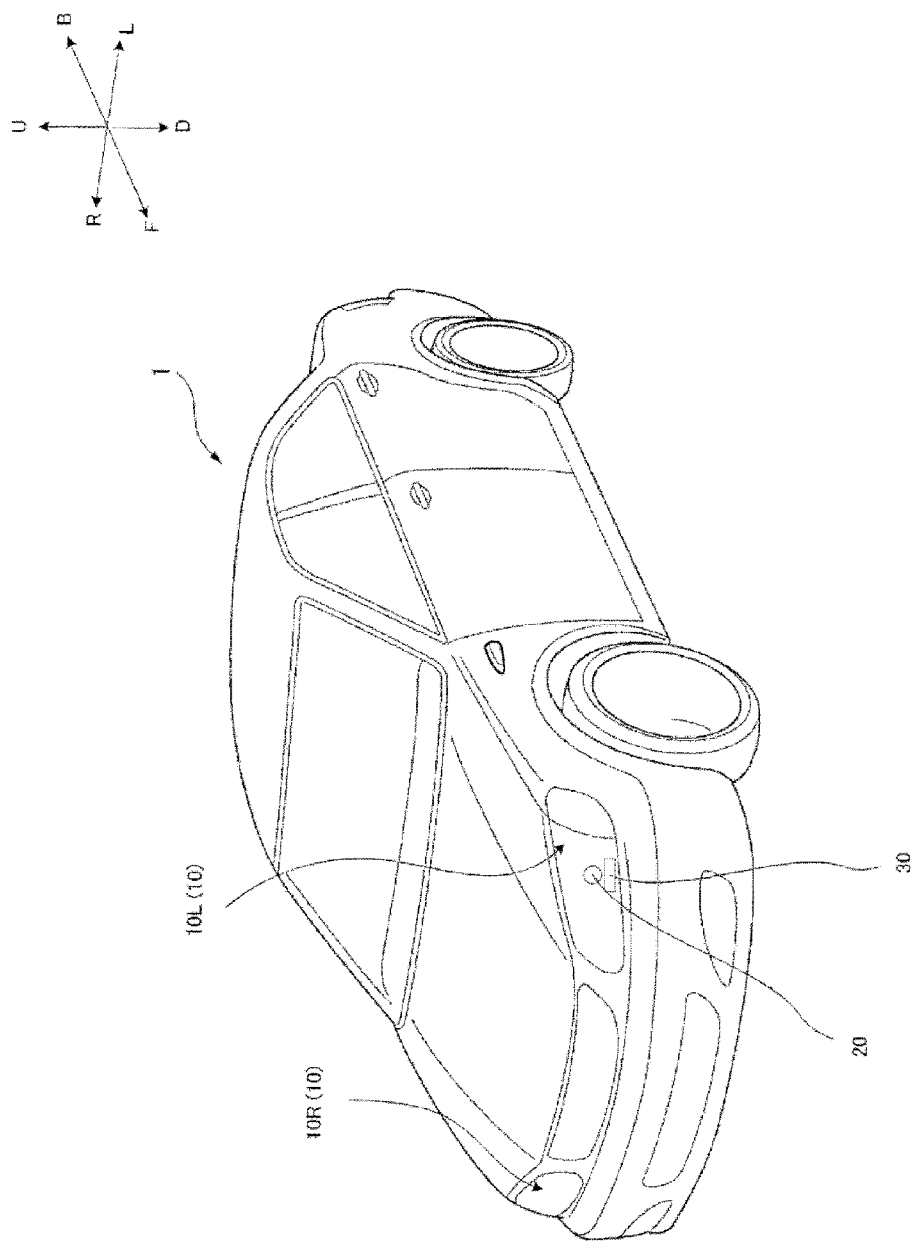
FIG. 1 is a perspective view of a vehicle on which a vehicle lamp according to an embodiment of the present disclosure is mounted.

In the following detailed description, reference is made to the accompanying drawings, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, embodiments of the present disclosure will be described with reference to the drawings. Dimensions of each member illustrated in the drawings may be different from actual dimensions of the each member for convenience of explanation. Further, "U, D, F, B, R, and L" illustrated in FIG. 1 indicate relative directions set for a vehicle 1 illustrated in FIG. 1. "U" refers to an upward direction, "D" refers to a downward direction, "F" refers to a forward direction, "B" refers to a backward direction, "R" refers to a right side direction, and "L" refers to a left side direction.

FIG. 1 is a perspective view of the vehicle 1 on which a headlamp 10 (an example of the vehicle lamp) according to the embodiment is mounted. The vehicle 1 includes a right side headlamp 10R and a left side headlamp 10L as the headlamp 10. The right side headlamp 10R is provided at the right side (R side) of the front (F side) of the vehicle 1, and the left side headlamp 10L is provided at the left side (L side) of the front (F side) of the vehicle 1. The right side headlamp 10R and the left side headlamp 10L are symmetrical in the configuration, and thus, hereinafter, the configuration of the left side headlamp 10L will be described, and the description of the right side headlamp 10R will be omitted.

Figure 2:
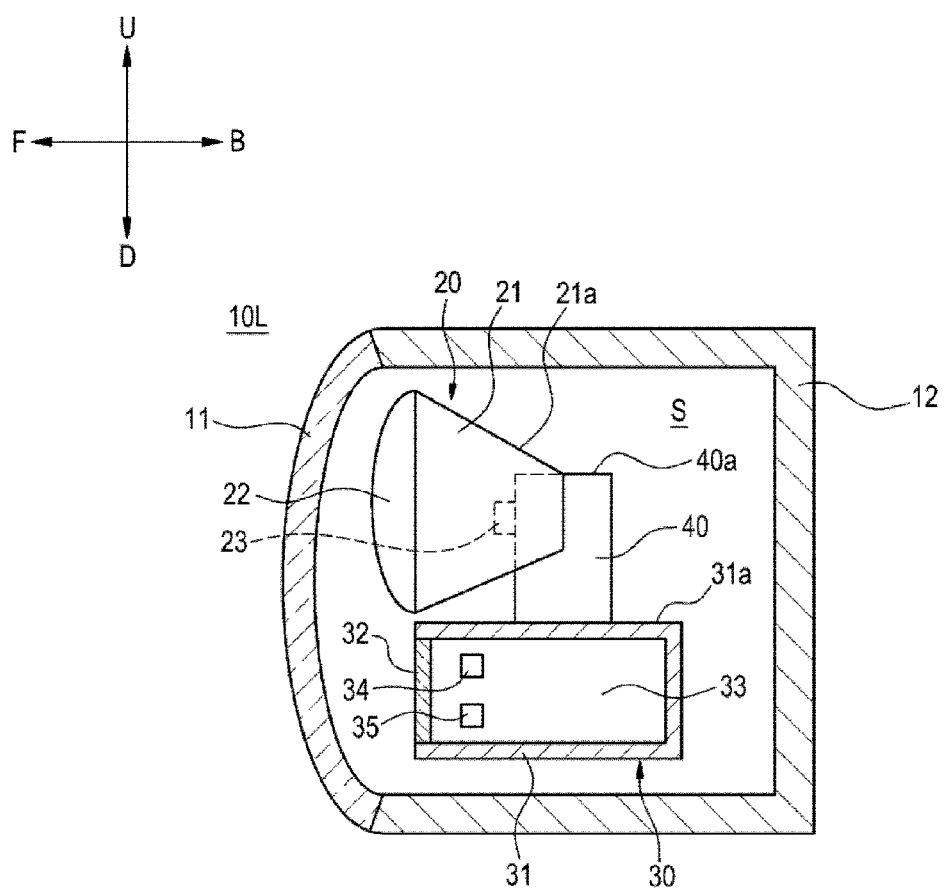
FIG. 2 is a schematic view of a left side headlamp illustrated in FIG. 1.

FIG. 2 is a schematic view of the left side headlamp 10L. As illustrated in FIG. 2, the left side headlamp 10 includes a cover 11 and a housing 12. A lamp chamber S of the left side headlamp 10L is formed by the cover 11 and the housing 12.

The left side headlamp 10L includes an LED unit 20 (an example of the lamp), a LiDAR unit 30 (an example of the sensor), and a support member 40 (an example of the connector) in the lamp chamber S. The cover 11 has light transmittance allowing the LED unit 20 and the LiDAR unit 30 to be visible from the outside of the cover 11.

The LED unit 20 includes a housing 21 and a lens 22. The LED unit 20 has an LED 23 (an example of the light emitting element) in the housing 21. The LED 23 is a light emitting element that emits light toward the front F of the vehicle 1 through the lens 22. The LED 23 is provided at the support member 40.

At least a part of the LED unit 20 may have a heat radiation function. For example, a surface 21a of the housing 21 of the LED unit 20 may have the heat radiation function. A portion that has the heat radiation function is made of a material having high thermal conductivity, or has a surface shape in which a surface area for the heat radiation in enlarged. The material having high thermal conductivity is a material having higher thermal conductivity than a resin (e.g., polypropylene, polycarbonate, or polyester), and is, for example, a metal of aluminum, copper, or silver, or a resin containing a thermally conductive filler.

The whole housing 21 may have the heat radiation function, and also the whole housing 21 may be made of a material having high thermal conductivity. In the embodiment, the whole housing 21 is formed of aluminum.

The LiDAR unit 30 includes a housing 31, a transmitting portion 32, and a LiDAR 33. The transmitting portion 32 is, for example, an infrared transmitting film.

The LiDAR unit 30 is arranged so as to allow the outer side of the housing 31 to be visible from the outside of the vehicle 1 through the cover 11, and is fixed to the housing 12 by a support member (not illustrated). The outer side of the housing 31 visible through the cover 11 is, for example, a portion of the front (F side) of the side surface of the left side (L side) of the housing 31. In this manner, the outside design of the housing 31 may be visible from the outside of the vehicle 1 by arranging the outside of the housing 31 to be visible from the outside of the vehicle 1.

The LiDAR unit 30 has the LiDAR 33 in the housing 31. The LiDAR 33 is configured to acquire information on the front F of the vehicle 1. The LiDAR refers to "Light Detection and Ranging" or "Laser Imaging Detection and Ranging." The LiDAR is a sensor that generally emits invisible light to the front side, and acquires information such as a distance to an object, a shape of the object, a material of the object, and a color of the object, based on the emitted light and the returned light. The LiDAR 33 has a light emitting element 34 that emits light toward the front F of the left side headlamp 10L, and a light receiving element 35 that receives light incident from the outside of the left side headlamp 10L.

At least a part of the exterior of the LiDAR unit 30 has a heat radiation function. For example, a surface on the left side (L side) of the housing 31 close to the outside of the vehicle 1, among a surface 31a of the housing 31 (an example of the exterior) of the LiDAR unit 30 has the heat radiation function. The heat radiation function stated here is the same as the heat radiation function of the LED unit 20. In the embodiment, the whole housing 31 of the LiDAR unit 30 is formed of aluminum or magnesium to be configured to have the heat radiation function.

The support member 40 supports the housing 21 so that the housing 21 of the LED unit 20 is fixed with respect to the LiDAR unit 30. In this manner, the support member 40 is the support member for the LED 23, and also serves as the support member that connects the LED unit 20 and the LiDAR unit 30.

Further, the LED unit 20 and the support member 40, and the support member 40 and the LiDAR unit 30 are integrated, respectively. The term "integrated" refers to a state where mutual positions are fixed, and includes fixing with a fixing member such as a screw, or molding by integral molding using, for example, a metal mold. In the embodiment, the housing 21 of the LED unit 20 is fixed to the support member by a screw (not illustrated), and the support member 40 is fixed to the housing of the LiDAR unit 30 by a screw (not illustrated).

The support member 40 is configured to be capable of conducting the heat generated from the LED unit 20 to the LiDAR unit 30. That is, the support member 40 thermally connects the LED unit 20 and the LiDAR unit 30. The term "thermally connect" refers to a connection through which heat generated from one side is able to be conducted to the other side. The term "thermally connect" includes a state where a contact surface where two members contact each other is provided, and heat is transferred by the contact surface. In the embodiment, the support member 40 is made of a material having high thermal conductivity (e.g., aluminum). Then, the LED unit 20 and the LiDAR unit 30 are thermally connected by fixing the LED unit 20 and the LiDAR unit 30 in a state where the support member 40 is thermally connected to the housing 21 and the housing 31.

At least a part of the support member 40 has the heat radiation function, in addition to the configuration capable of conducting the heat generated from the LED unit 20 to the LiDAR unit 30. For example, a surface 40a of the support member 40 may be configured to have the heat radiation function. The heat radiation function stated here is also the same as the heat radiation function of the LED unit 20.

Since the LED unit 20 and the LiDAR unit 30 are thermally connected, heat generated from the LED 23 is transferred to the housing 31 of the LiDAR unit 30 through the support member 40. Heat generated form the LiDAR 33 is transferred to the housing 31 of the LiDAR unit 30. The heat transferred to the LiDAR unit 30 is released from the housing 31, since at least a part of the housing 31 of the LiDAR unit 30 has the heat radiation function.

According to the headlamp 10 having the above configuration, the LED unit 20 including the LED 23 and the LiDAR unit 30 are provided, the LED unit 20 and the LiDAR unit 30 are thermally connected, and at least a part of the exterior (housing 31) of the LiDAR unit 30 has the heat radiation function. Therefore, the heat generated from the LED unit 20 and the heat generated from the LiDAR 33 may be released from the housing 31 of the LiDAR unit 30. Therefore, it is not required to include a separate member for radiating heat in the headlamp 10, so that the degree of freedom in designing the headlamp 10 may be improved.

That is, in the related art, there has been a restriction on design in that a lamp unit is necessary to be arranged in the vicinity of a heat radiating member in order to release the heat generated from the lamp unit in designing of a vehicle lamp such as a headlamp. Further, in a case where it is required to arrange a sensor in a vehicle lamp, since a space that may be used for the vehicle lamp was limited, it is impossible to arrange a sufficient heat radiation member in order not to adversely affect the sensor by the heat from the lamp unit. Therefore, the sensor is not able to be arranged in the vehicle lamp.

Meanwhile, according to the configuration of the embodiment, since the LED unit 20 and the LiDAR unit 30 are thermally connected and at least a part of the exterior (housing 31) of the LiDAR unit 30 has the heat radiation function, the heat generated from the LED unit 20 and the heat generated from the LiDAR 33 may be released from the housing 31 of the LiDAR unit 30. Therefore, it is possible to omit a hear radiating member serving as a separate member in the related art, and thus, it is possible to improve the degree of freedom in designing the headlamp 10 while arranging the LiDAR unit 30.

Further, since at least a part of the LEC unit 20 has the heat radiation function, the heat generated from the LED unit 20 may be released from the LED unit 20 and the housing 31 of the LiDAR unit 30. Therefore, it is possible to release the heat more efficiently.

Further, the headlamp 10 of the embodiment includes the support member 40 that connects the LED unit 20 and the LiDAR unit 30, and at least a part of the support member 40 has the heat radiation function. Therefore, it is possible to release the heat more efficiently, since the heat generated from the LED unit 20 and the heat generated from the LiDAR 33 may be released from the support member 40 in addition to the heat radiation from the housing 31 of the LiDAR unit 30.

Further, in the embodiment, at least a part of the housing 31 of the LiDAR unit 30 has the heat radiation function, and the LED unit 20 and the LiDAR unit 30 are integrated. Thus, the heat radiating member serving as a separate member in the related art may be omitted. Therefore, the degree of freedom in designing the headlamp 10 is improved.

Further, it is possible to omit the heat radiation member serving as a separate member in the related art. Therefore, the number of components may be reduced.

Further, according to the configuration in which the whole housing 31 of the LiDAR unit 30 is formed of a material having the heat radiation function, the heat generated from the LED unit 20 and transferred to the housing 31 through the support member 40 and the heat generated from the LiDAR 33 are released from the whole surface of the housing more efficiently.

Descriptions have been made on the example in which the LED unit 20, the LiDAR unit 30, and the support member 40 have the heat radiation function, but at least the LiDAR unit 30 may have the heat radiation function.

(Modification 1)

A sensor unit is not limited to the LiDAR unit 30 described above. Hereinafter, an example including a camera unit 30A as a sensor unit will be described. Identical or equal portions will be denoted by the same symbols in the drawings, and descriptions thereof will be omitted or simplified.

Figure 3:
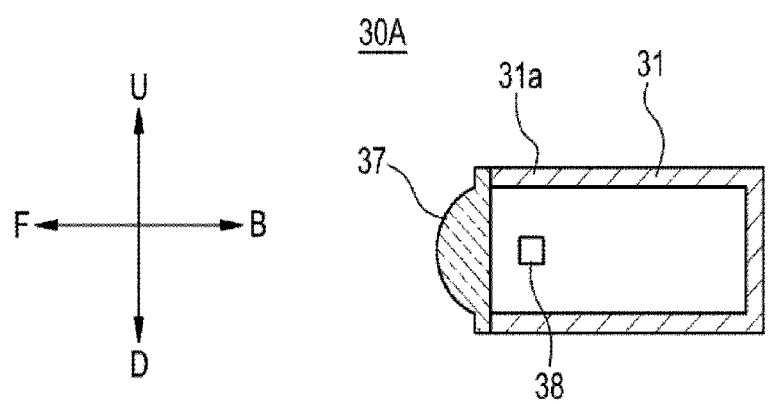
FIG. 3 is a schematic view of a sensor unit according to a modification.

FIG. 3 is a schematic view of the camera unit 30A. The camera unit 30A is fixed to the housing 12 of the left side headlamp 10L by a support member (not illustrated). The camera unit 30A includes a housing 31 and a lens 37. The lens 37 is, for example, a convex lens that protrudes toward the F side. The camera unit 30A has a light emitting/receiving element 38 in the housing 31.

The camera is, for example, a camera that includes an imaging device such as a charge-coupled device (CCD) or a complementary metal-oxide semiconductor (CMOS). Further, the camera is a camera that detects visible light, or an infrared camera that detects infrared ray.

At least a part of the housing 31 (an example of the exterior) of the camera unit 30A has the heat radiation function as the housing 31 of the LiDAR unit 30. Therefore, the heat generated from the LED unit 20 and transferred to the camera unit 30A is radiated from the housing 31. It is similar to the housing 31 of the LiDAR unit 30 in that the whole housing 31 of the camera unit 30A may have the heat radiation function, and a part of or the whole housing 31 may be made of a material having high thermal conductivity.

The headlamp 10 is described as an example of the vehicle lamp in the above embodiment, but the vehicle lamp of the present disclosure is not limited to the headlamp. The vehicle lamp of the present disclosure may be a various types of vehicle lamps mounted on the vehicle 1. The various types of vehicle lamps include, for example, a position lamp provided at the front portion of the vehicle 1, a rear combination lamp provided at the rear portion of the vehicle 1, a turn signal lamp provided at the front portion or the side portion of the vehicle, and a various types of lamps that indicate a situation of the own vehicle to pedestrians or other drivers of the vehicles.

Further, the LiDAR unit and the camera unit are illustrated as the sensor unit in the above embodiment, but the sensor unit of the present disclosure is not limited to the above examples. The sensor unit may be any sensor capable of acquiring information on outside the own vehicle, and may be, for example, a radar unit including a radar such as a millimeter wave radar, a microwave radar, or a laser radar.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicle lamp mounted on a vehicle, the vehicle lamp comprising:
    a lamp including a light emitting element; and
    a sensor configured to acquire information on outside the vehicle,
    wherein the lamp and the sensor are thermally connected such that heat is transferred from the lamp to the sensor, and
    at least a part of an exterior of the sensor has a heat radiation function.

2. The vehicle lamp of claim 1, further comprising:
    a connector configured to connect the lamp and the sensor,
    wherein at least a part of either of the lamp and the connector has a heat radiation function.

3. The vehicle lamp of claim 1, wherein a portion that has the heat radiation function is made of a material having high thermal conductivity.

4. The vehicle lamp of claim 2, wherein a portion that has the heat radiation function is made of a material having high thermal conductivity.

5. The vehicle lamp of claim 1, wherein the lamp and the sensor are integrated.

6. The vehicle lamp of claim 2, wherein the lamp and the sensor are integrated.

7. The vehicle lamp of claim 3, wherein the lamp and the sensor are integrated.

8. The vehicle lamp of claim 4, wherein the lamp and the sensor are integrated.

9. The vehicle lamp of claim 1, wherein the sensor includes a camera provided with a lens and a housing in which a light emitting and receiving element is accommodated.

* * * * *